(12) United States Patent
Nakamori et al.

(10) Patent No.: US 8,433,100 B2
(45) Date of Patent: Apr. 30, 2013

(54) LANE RECOGNITION DEVICE

(71) Applicant: Honda Motor Co., Ltd., Tokyo (JP)

(72) Inventors: Takuma Nakamori, Wako (JP); Tomoyoshi Aoki, Wako (JP); Jun Tanaka, Wako (JP); Sachio Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/644,549

(22) Filed: Oct. 4, 2012

(65) Prior Publication Data

US 2013/0028479 A1    Jan. 31, 2013

Related U.S. Application Data

(62) Division of application No. 12/715,898, filed on Mar. 2, 2010, now Pat. No. 8,306,269.

(30) Foreign Application Priority Data

Mar. 12, 2009 (JP) .................................. 2009-059480
Apr. 3, 2009 (JP) .................................. 2009-091319

(51) Int. Cl.
*G06K 9/00* (2006.01)

(52) U.S. Cl.
USPC ........... 382/104; 382/100; 382/103; 382/181; 382/190; 348/135; 348/143; 348/148; 348/159; 340/425.5; 340/436; 340/437; 340/901; 340/937; 700/1; 700/2; 700/23; 700/28

(58) Field of Classification Search .......................... None
See application file for complete search history.

(56) References Cited

U.S. PATENT DOCUMENTS

| 5,555,555 | A | 9/1996 | Sato et al. |
| 6,115,652 | A | 9/2000 | Sato et al. |
| 6,343,247 | B2 | 1/2002 | Jitsukata et al. |
| 6,718,241 | B2 | 4/2004 | Kondo et al. |
| 6,813,370 | B1 * | 11/2004 | Arai .............................. 382/104 |
| 7,346,190 | B2 | 3/2008 | Taniguchi et al. |

(Continued)

FOREIGN PATENT DOCUMENTS

JP    3538476 B2    6/2004

OTHER PUBLICATIONS

Aubert et al., "Autonomous Navigation of Structured City Roads", 1990, In Proceedings of SPIE Mobile Robots V.

(Continued)

*Primary Examiner* — Matthew Bella
*Assistant Examiner* — Jason Heidemann
(74) *Attorney, Agent, or Firm* — Carrier Blackman & Associates, P.C.; Joseph P. Carrier; William D. Blackman

(57) ABSTRACT

The lane mark recognition device is equipped with a lane mark detecting unit which executes a lane mark detection process in each predetermined control cycle, and adds a detection presence/absence data to a ring buffer, a detection presence/absence data addition inhibiting unit which inhibits addition of the detection presence/absence data to the ring buffer when the vehicle is traveling in the intersection, and a lane mark position recognizing unit which recognizes a relative position of the vehicle and the lane mark, when the lane mark is detected in the situation where a lane mark detection rate calculated from the data of the ring buffer is higher than a reliability threshold value.

2 Claims, 12 Drawing Sheets

U.S. PATENT DOCUMENTS

| | | | |
|---|---|---|---|
| 7,653,482 B2* | 1/2010 | Sumizawa | 701/448 |
| 7,808,523 B2* | 10/2010 | Nishida et al. | 348/148 |
| 2002/0080618 A1 | 6/2002 | Kobayashi et al. | |
| 2002/0095246 A1* | 7/2002 | Kawazoe | 701/1 |
| 2003/0103650 A1* | 6/2003 | Otsuka et al. | 382/104 |
| 2004/0042638 A1* | 3/2004 | Iwano | 382/104 |
| 2007/0050134 A1 | 3/2007 | Hayashida et al. | |

OTHER PUBLICATIONS

Crisman et al., "SCARF: A Color Vision System That Tracks Roads and Intersections", Feb. 1993, IEEE Trans. Robot. Automat., vol. 9, pp. 49-58.

* cited by examiner

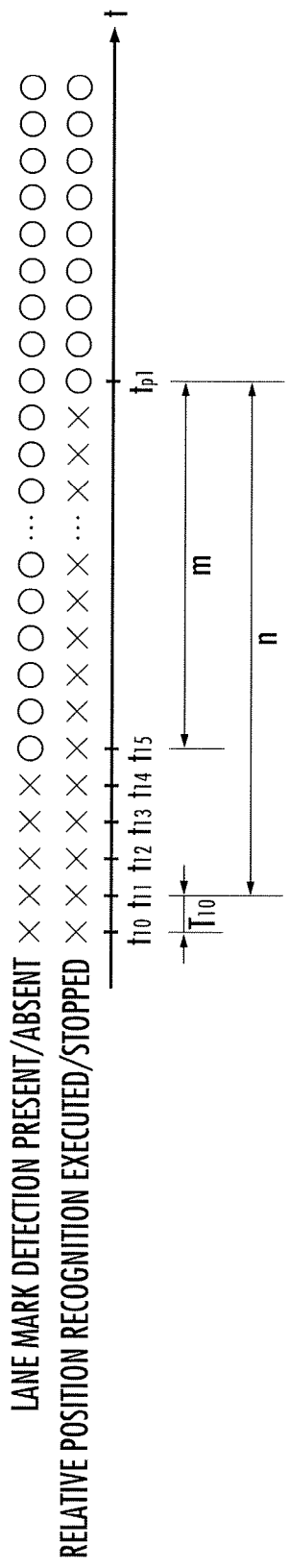

LANE RECOGNITION DEVICE

CROSS-REFERENCE TO RELATED APPLICATIONS

This application is a divisional of U.S. application Ser. No. 12/715,898 filed 2 Mar. 2010, which claims priority under 35 USC §119 based on Japanese patent application No. 2009-059480 filed on 12 Mar. 2009, and Japanese patent application No. 2009-091319 filed on 3 Apr. 2009. The subject matter of each of these priority documents is incorporated by reference herein.

BACKGROUND OF THE INVENTION

1. Field of the Invention

The present invention relates to a lane recognition device which recognizes a relative position of a vehicle and a lane mark, by detecting the lane mark partitioning a traffic lane of a road.

2. Description of the Related Art

Conventionally, there is proposed a technique of calculating a relative distance and the like of the lane mark and the vehicle, by obtaining a road image in each predetermined control cycle by a camera mounted on a vehicle, collecting candidates of image portion of the lane mark detected from each road image from a predetermined short period of time, and converting a camera coordinate of each image portion to a real space coordinate (for example, refer to Japanese Patent No. 3538476).

In the conventional technique mentioned above, the real space position of the lane mark is recognized by collecting the candidates of the image portion of the lane mark detected from the road images obtained in each continuing control cycle from a predetermined short period of time, and converting the same to the real space coordinate. In this case, as a criterion of a reliability of the recognition of the real space position of the lane mark, an average detection rate of lane mark in a predetermined period immediately before is generally used, as is shown in FIG. 8.

In FIG. 8, the results of the lane mark detection processing executed in each control cycle $T_{10}$ are indicated by o when the lane mark is detected, and by x when the lane mark is not detected. Further, the time when it is judged that the reliability of the lane mark detection is high and the recognition of the relative position of the lane mark and the vehicle is executed is indicated by o, and the time when it is judged that the reliability of the lane mark detection is low and the recognition of the relative position of the lane mark and the vehicle is stopped is indicated by x.

As for the reliability of the lane mark detection, when the number of the cycles in which lane mark is detected is equal to or more than m in a period of n cycles ($t_{11}$-$t_{p1}$) immediately before the time of judgment $t_{p1}$, it is judged that the reliability of lane mark detection is high, and the relative position of the lane mark and the vehicle is recognized.

In this case, when it is switched from the state where the lane mark is not detected (the state where x continued, until $t_{14}$) to the state where the lane mark is detected (transit from x to o, $t_{15}$ onward), the reliability of lane mark detection is not judged to be high until lapse of time corresponding to at least m times $T_{10}$, so that the recognition of the relative position of the lane mark and the vehicle cannot be started.

Therefore, when the vehicle temporarily travels on a section in which the lane mark is not laid, for example in the case where the vehicle passes through an intersection, or in the case where the vehicle travels in a branching or a converging point at an interchange, the recognition of the relative position of the lane mark and the vehicle stops from the decrease in the reliability of lane mark detection. Thereafter, a certain period of time is necessary until it is judged that the reliability of lane mark detection is high even after it is returned to the state where lane marks are laid.

In this case, even when the vehicle passes through the intersection or the branching or the converging section and returns to the state where it is possible to steadily detect the lane mark, the state where the recognition of the relative position of the lane mark and the vehicle is stopped continues. Therefore, there is an inconvenience that it is not possible to promptly resume a lane maintaining control of assist driving a steering in order to maintain the traffic lane, or a departure warning control from the traffic lane and the like.

SUMMARY OF THE INVENTION

In view of such circumstances, an object of the present invention is to provide a lane recognition device which could shorten the period in which the recognition of the relative position of the lane mark and the vehicle is stopped, while securing high reliability of lane mark detection.

In order to achieve the above object, the present invention provides a lane recognition device, comprising: a lane mark detecting unit which executes a processing of detecting a lane mark partitioning a traffic lane of a road from an image of the road in the surrounding of a vehicle captured by a camera mounted on the vehicle in each predetermined control cycle; a data storing unit which sequentially adds and stores a detection presence/absence data indicating presence/absence of detection of the lane mark in each control cycle; a lane mark detection rate calculating unit which calculates a lane mark detection rate which is an average detection rate of the lane mark from the latest detection presence/absence data to the detection presence/absence data prior to the same by a predetermined number that are stored in the data storing unit; a lane mark position recognizing unit which recognizes a relative position of the vehicle and the lane mark on the basis of the detection result of the lane mark by the lane mark detecting unit, when the lane mark detection rate is higher than a predetermined reliability threshold value, and stops recognition of the relative position, when the lane mark detection rate is equal to or less than the reliability threshold value; a traveling state detecting unit which detects the fact that the vehicle is traveling in a intersection or a branching or a converging section of the road; and a detection presence/absence data addition inhibiting unit which inhibits addition of the new detection presence/absence data to the data storing unit, when the traveling state detecting unit detects that the vehicle is traveling in the intersection or the branching or the converging section of the road.

According to the present invention, when it is detected by the traveling state detecting unit that the vehicle is traveling in the intersection or the branching or the converging section of the road (hereinafter referred to as a lane mark uninstalled section), the detection presence/absence data addition inhibiting unit inhibits addition of new detection presence/absence data to the data storing unit. Therefore, during the time when the vehicle passes through the lane mark uninstalled section and returns to the state where the right and left lane marks of the road are detected by the lane mark detecting unit, the data storing unit keeps storing the lane mark detection presence/absence data stored immediately before the vehicle enters the lane mark uninstalled section.

Before the vehicle enters the lane mark uninstalled section, it is assumed that the right and left lane marks of the road are stably detected and the lane mark detection rate is higher than the reliability threshold value. Therefore, when the vehicle passes through the lane mark uninstalled section and returns to the state where the lane mark detecting unit detects the right and left lane marks of the road, it is expected that the lane mark detection rate calculated by the lane mark detection rate calculating unit becomes higher than the reliability threshold value, and that the recognition of the relative position of the vehicle and the lane mark by the lane mark position recognizing unit is promptly resumed.

The inhibition of adding the detection presence/absence data to the data storing unit by the detection presence/absence data addition inhibiting unit is carried out only if it is detected by the traveling state detecting unit that the vehicle is traveling in the lane mark uninstalled section. Therefore, it becomes possible to shorten the period in which the recognition of the relative position of the vehicle and the lane mark by the lane mark position recognizing unit is stopped, while securing high reliability of the lane mark detection.

Further, the traveling state detecting unit detects that the vehicle is traveling in the intersection, when an image of a pedestrian crossing is included in the captured image by the camera.

According to the present invention, the traveling state detecting unit may easily detect the state that the vehicle is traveling in the intersection, by judging whether the image of the pedestrian crossing, which is likely provided inside the intersection, is included in the captured image by the camera.

Next, as a second aspect of the present invention, the lane recognition device comprises a lane mark position recognizing unit which recognizes a relative position of the vehicle and the lane mark on the basis of the detection result of the lane mark by the lane mark detecting unit, if the lane mark detection rate is higher than a predetermined reliability threshold value; and a traveling state detecting unit which detects the fact that the vehicle has passed through an intersection or a branching or a converging section of the road; wherein when it is detected by the traveling state detecting unit that the vehicle has passed through the intersection or the branching or the converging section of the road, the lane mark position recognizing unit recognizes the relative position of the vehicle and the lane mark even if the lane mark detection rate is equal to or lower than the reliability threshold value, from the point in time when the passing through is detected until a predetermined condition is satisfied, and during the period other than the period from the point in time when the passing through is detected until the predetermined condition is satisfied, the lane mark position recognizing unit stops recognition of the relative position of the vehicle and the lane mark when the lane mark detection rate is equal to or lower than the reliability threshold value.

According to the present invention, reliability of the lane mark detection is enhanced, by the lane mark position recognizing unit recognizing the relative position of the lane mark detected by the lane mark detecting unit and the vehicle, basically only when the lane mark detection rate is higher than the reliability threshold value.

When it is detected by the traveling state detecting unit that the vehicle has passed through the intersection or the branching or the converging section of the road (hereinafter referred to as the lane mark uninstalled section), it is assumed that it is returned to the state where the right and left lane marks of the road are thereafter stably detected. Therefore, when it is detected by the traveling state detecting unit that the vehicle has passed through the lane mark uninstalled section, the lane mark position recognizing unit recognizes the relative position of the vehicle and the lane mark even if the lane mark detection rate is equal to or less than the reliability threshold value, during the period from the point in time when the passing through is detected until the predetermined condition is satisfied.

By doing so, it becomes possible to promptly resume the recognition of the relative position of the vehicle and the lane mark by the lane mark position recognizing unit after the vehicle has passed through the lane mark uninstalled section, while maintaining high reliability of the lane mark recognition.

Further, when a lane mark detected state in which right and left lane marks of the road are detected by the lane mark detecting unit is switched to a lane mark undetected state in which at least one of the right and left lane marks of the road is not detected by the lane mark detecting unit, the traveling state detecting unit calculates a trajectory of the vehicle from a first point in time when the lane mark detected state is switched to the lane mark undetected state until a second point in time when it is subsequently returned to the lane mark detected state, and the traveling state detecting unit detects that the vehicle has passed through the intersection or the branching or the converging section of the road, when an amount of change of the trajectory in the road width direction is equal to or less than a predetermined width direction amount of change threshold value.

According to the present invention, the traveling state detecting unit calculates the trajectory of the vehicle from the first point in time when the lane mark detected state is switched to the lane mark undetected state to the second point in time when it is subsequently returned to the lane mark detected state. Thereafter, in the case where the amount of change of the trajectory of the vehicle in the road width direction is equal to or less than the width direction amount of change threshold value, it may be judged that the moving amount of the vehicle in the road width direction is small, and that the straightness of the movement of the vehicle during the first point in time and the second point in time is high. Therefore, in this case, the traveling state detecting unit may detect that the vehicle has passed through the lane mark uninstalled section.

Further, the traveling state detecting unit detects that the vehicle has passed through the intersection or the branching or the converging section of the road, when the amount of change of the trajectory in the road width direction is equal to or less than the predetermined width direction amount of change threshold value, and also, a difference between a width between the right and left lane marks of the road detected by the lane mark detecting unit immediately before the first point in time and the width between the right and left lane marks of the road detected by the lane mark detecting unit at the second point in time is equal to or less than a predetermined road width change threshold value.

According to the present invention, if the difference between the width between the right and left lane marks of the road detected by the lane mark detecting unit immediately before the first point in time, and the width between the right and left lane marks of the road detected by the lane mark detecting unit at the second point in time is equal to or less than the road width change threshold value, it may be judged that the continuousness of the lane mark before and after the lane mark undetected state is high. Therefore, it becomes possible to enhance the reliability of the detection of the fact that the vehicle has passed through the lane mark uninstalled section by the traveling state detecting unit.

Further, the lane recognition device comprises a vehicle speed sensor which detects a traveling speed of the vehicle, and the traveling state detecting unit detects that the vehicle has passed through the intersection or the branching or the converging section of the road, when the amount of change of the trajectory in the road width direction is equal to or less than the predetermined width direction amount of change threshold value, and also, the lapsed time from the first point in time to the second point in time is shorter than an anticipated passing time of the intersection or the branching or the converging section of the road calculated using an assumed value of a passing distance of the intersection or the branching or the converging section of the road and the traveling speed of the vehicle detected by the vehicle speed sensor.

According to the present invention, for example when the state in which the lane mark of the road is not provided from a road repair work and the like continues for more than the anticipated passing time, the recognition of the relative position of the vehicle and the lane mark by the lane mark position recognizing unit is not executed. Therefore, it becomes possible to enhance the reliability of the detection of the fact that the vehicle has passed through the lane mark uninstalled section by the traveling state detecting unit.

Further, when a lane mark detected state in which right and left lane marks of the road are detected by the lane mark detecting unit is switched to a lane mark undetected state in which at least one of the right and left lane marks of the road is not detected by the lane mark detecting unit, the traveling state detecting unit calculates a trajectory of the vehicle from a first point in time when the lane mark detected state is switched to the lane mark undetected state until a second point in time when it is subsequently returned to the lane mark detected state, and the traveling state detecting unit detects that the vehicle has passed through the intersection or the branching or the converging section of the road, when an amount of change of a direction of the trajectory between the first point in time and the second point in time is equal to or less than a predetermined direction of movement threshold value.

According to the present invention, the traveling state detecting unit calculates the trajectory of the vehicle from the first point in time when the lane mark detected state switched to the lane mark undetected state, to the second point in time when it is subsequently returned to the lane mark detected state. Thereafter, in the case where the amount of change of the direction of the trajectory from the direction of movement of the vehicle at the first point in time is equal to or less than the direction of movement threshold value, it may be judged that the change of the direction of movement of the vehicle is small, and that the straightness of the movement of the vehicle from the first point in time to the second point in time is high. In this case, the traveling state detecting unit may detect that the vehicle has passed through the lane mark uninstalled section.

Further, the traveling state detecting unit detects that the vehicle has passed through the intersection or the branching or the converging section of the road, when an amount of change of the direction of the trajectory between the first point in time and the second point in time is equal to or less than the predetermined direction of movement threshold value, and also, a difference between a width between the right and left lane marks of the road detected by the lane mark detecting unit immediately before the first point in time and the width between the right and left lane marks of the road detected by the lane mark detecting unit at the second point in time is equal to or less than a predetermined road width change threshold value.

In the present invention, when the difference between the width between the right and left lane marks of the road detected by the lane mark detecting unit immediately before the first point in time, and the width between the right and left lane marks of the road detected by the lane mark detecting unit at the second point in time, is equal to or less than the road width change threshold value, it may be judged that the continuousness of the lane mark before and after the lane mark undetected state is high. Therefore, it becomes possible to enhance the reliability of the detection of the fact that the vehicle has passed through the lane mark uninstalled section by the traveling state detecting unit.

Further, the lane recognition device comprises the vehicle speed sensor which detects the traveling speed of the vehicle, and the traveling state detecting unit detects that the vehicle has passed through the intersection or the branching or the converging section of the road, when an amount of change of the direction of the trajectory between the first point in time and the second point in time is equal to or less than the predetermined direction of movement threshold value, and also, the lapsed time from the first point in time to the second point in time is shorter than an anticipated passing time of the intersection or the branching or the converging section of the road calculated using an assumed value of a passing distance of the intersection or the branching or the converging section of the road and the traveling speed of the vehicle detected by the vehicle speed sensor.

According to the present invention, for example when the state in which the lane mark of the road is not provided from a road repair work and the like continues for more than the anticipated passing time, the recognition of the relative position of the vehicle and the lane mark by the lane mark position recognizing unit is not executed. Therefore, it becomes possible to enhance the reliability of the detection of the fact that the vehicle has passed through the lane mark uninstalled section by the traveling state detecting unit.

Further, the lane recognition device comprises a vehicle speed sensor which detects a traveling speed of the vehicle, and a yaw rate sensor which detects a yaw rate of the vehicle, and the traveling state detecting unit calculates the trajectory of the vehicle from the first point in time to the second point in time, using the traveling speed of the vehicle detected by the vehicle speed sensor, and the yaw rate of the vehicle detected by the yaw rate sensor.

According to the present invention, it becomes possible to recognize the direction of movement of the vehicle from the yaw rate of the vehicle (an angular acceleration around a vertical axis of the vehicle), recognize the traveling distance of the vehicle from the traveling speed of the vehicle, and calculate the trajectory of the vehicle.

Further, the lane recognition device comprises a torque sensor which detects a torque applied to a steering of the vehicle, and when a lane mark detected state in which right and left lane marks of the road are detected by the lane mark detecting unit is switched to a lane mark undetected state in which at least one of the right and left lane marks of the road is not detected by the lane mark detecting unit, the traveling state detecting unit detects that the vehicle has passed through the intersection or the branching or the converging section of the road when a maximum value of the torque detected by the torque sensor between a first point in time when the lane mark detected state is switched to the lane mark undetected state and a second point in time when it is subsequently returned to the lane mark detected state is equal to or less than a predetermined torque threshold value, or when an amount of change of the torque detected by the torque sensor between the first point in time and the second point in time is equal to or less than a predetermined torque amount of change threshold value.

According to the present invention, in the case where the torque detected by the torque sensor from the first point in time to the second point in time is equal to or less than the torque threshold value, it may be judged that the steering operation of the driver is gradual, and that the straightness of the movement of the vehicle from the first point in time to the second point in time is high. Therefore, in this case, the traveling state detecting unit may detect that the vehicle has passed through the lane mark uninstalled section.

Further, the lane recognition device comprises a steering angle sensor which detects a steering angle of the vehicle, and when a lane mark detected state in which right and left lane marks of the road are detected by the lane mark detecting unit is switched to a lane mark undetected state in which at least one of the right and left lane marks of the road is not detected by the lane mark detecting unit, the traveling state detecting unit detects that the vehicle has passed through the intersection or the branching or the converging section of the road when a maximum value of the steering angle of the vehicle detected by the steering angle sensor between a first point in time when the lane mark detected state is switched to the lane mark undetected state and a second point in time when it is subsequently returned to the lane mark detected state is equal to or less than a predetermined steering angle threshold value, or when an amount of change of the steering angle of the vehicle detected by the steering angle sensor between the first point in time and the second point in time is equal to or less than a predetermined steering angle amount of change threshold value.

According to the present invention, in the case where the steering angle detected by the steering angle sensor from the first point in time to the second point in time is equal to or less than the steering angle threshold value, it may be judged that the operating amount of the steering by the driver is small, and that the straightness of the movement of the vehicle between the first point in time and the second point in time is high. Therefore, in this case, the traveling state detecting unit may detect that the vehicle has passed through the lane mark uninstalled section.

Further, the vehicle includes at least a pair of the right and left wheels, the lane recognition device comprises a rotational speed difference detecting unit which detects a rotational speed difference between the right and left wheels, and when a lane mark detected state in which right and left lane marks of the road are detected by the lane mark detecting unit is switched to a lane mark undetected state in which at least one of the right and left lane marks of the road is not detected by the lane mark detecting unit, the traveling state detecting unit detects that the vehicle has passed through the intersection or the branching or the converging section of the road when a maximum value of the rotational speed difference of the right and left wheels detected by the rotating speed difference detecting unit between a first point in time when the lane mark detected state is switched to the lane mark undetected state and a second point in time when it is subsequently returned to the lane mark detected state is equal to or less than a predetermined rotational speed difference threshold value, or when an amount of change of the rotational speed difference of the right and left wheels detected by the rotational speed difference detecting unit between the first point in time and the second point in time is equal to or less than a predetermined wheel speed difference amount of change threshold value.

According to the present invention, the speed difference between the right and left wheels of the vehicle detected by the rotational speed difference detecting unit changes according to the change of the direction of movement of the vehicle (degree of curve). Therefore, if the rotational speed difference between the right and left wheels detected by the rotational speed difference detecting unit from the first point in time to the second point in time, or the amount of change thereof, is equal to or less than the wheel speed difference amount of change threshold value, it may be judged that the straightness of the movement of the vehicle from the first point in time to the second point in time is high. Therefore, in this case, the traveling state detecting unit may detect that the vehicle has passed through the lane mark uninstalled section.

Further, when a lane mark detected state in which right and left lane marks of the road are detected by the lane mark detecting unit is switched to a lane mark undetected state in which at least one of the right and left lane marks of the road is not detected by the lane mark detecting unit, the traveling state detecting unit detects that the vehicle has passed through the intersection or the branching or the converging section of the road, when a difference between the relative position of the vehicle and the lane mark recognized by the lane mark position recognizing unit on the basis of the detection result of the lane mark by the lane mark detecting unit immediately before a first point in time when the lane mark detected state is switched to the lane mark undetected state, and the relative position of the vehicle and the lane mark recognized by the lane mark position recognizing unit on the basis of the detection result of the lane mark by the lane mark detecting unit at a second point in time when it is subsequently switched to the lane mark detected state, is equal to or less than a predetermined relative position difference threshold value.

According to the present invention, if the difference between the relative position of the vehicle and the lane mark immediately before the first point in time and the relative position of the vehicle and the lane mark at the second point in time is equal to or less than the relative position difference threshold value, it may be judged that the change of the width between the lane marks at the first point in time and the second point in time is small, and the straightness of the movement of the vehicle from the first point in time to the second point in time is high. Therefore, in this case, the traveling state detecting unit may detect that the vehicle has passed through the lane mark uninstalled section.

BRIEF DESCRIPTION OF THE DRAWINGS

FIG. 8 is an explanatory view of the reliability judgment of the lane mark detection;

DETAILED DESCRIPTION OF THE PREFERRED EMBODIMENTS

Embodiments according to the present invention will now be described in detail with reference to FIG. 1 through FIG. 12.

Figure 1:
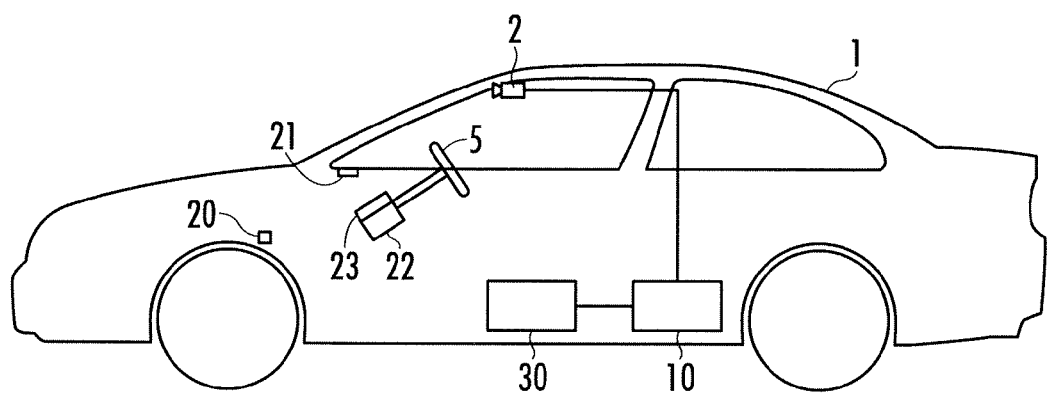
FIG. 1 is an explanatory view indicating the mounting mode of a lane recognition device of the present invention to a vehicle.

With reference to FIG. 1, a lane recognition device 10 (corresponds to a lane recognition device 10a of a first embodiment and a lane recognition device 10b of a second embodiment to be explained later) is used by being mounted on a vehicle 1 (a vehicle of the present invention), and detects a lane mark laid on a road for partitioning a driving lane, from an image of a road captured by a camera 2 for capturing images in front of the vehicle 1, and recognizes the relative position of the lane mark and the vehicle 1.

The data of the relative position of the lane mark recognized by the lane recognition device 10 and the vehicle 1 is output to an ECU (Electronic Control Unit) 30 of the vehicle 1. The ECU 30 executes a lane maintaining control which assist drives a steering 5 so that the vehicle 1 is maintained within the driving lane, and a lane departure warning control which carries out a warning (by voice output from a loudspeaker not shown and the like), in the state where the vehicle 1 may depart from the driving lane, on the basis of the relative position of the lane mark and the vehicle 1.

Further, the vehicle 1 is equipped with a vehicle speed sensor 20 for detecting the traveling speed of the vehicle 1, a yaw rate sensor 21 for detecting an angular acceleration around a vertical axis of the vehicle 1, a steering angle sensor 22 for detecting a steering angle of the steering 5, and a torque sensor 23 for detecting a torque applied to the steering 5.

First Embodiment

Figure 2:
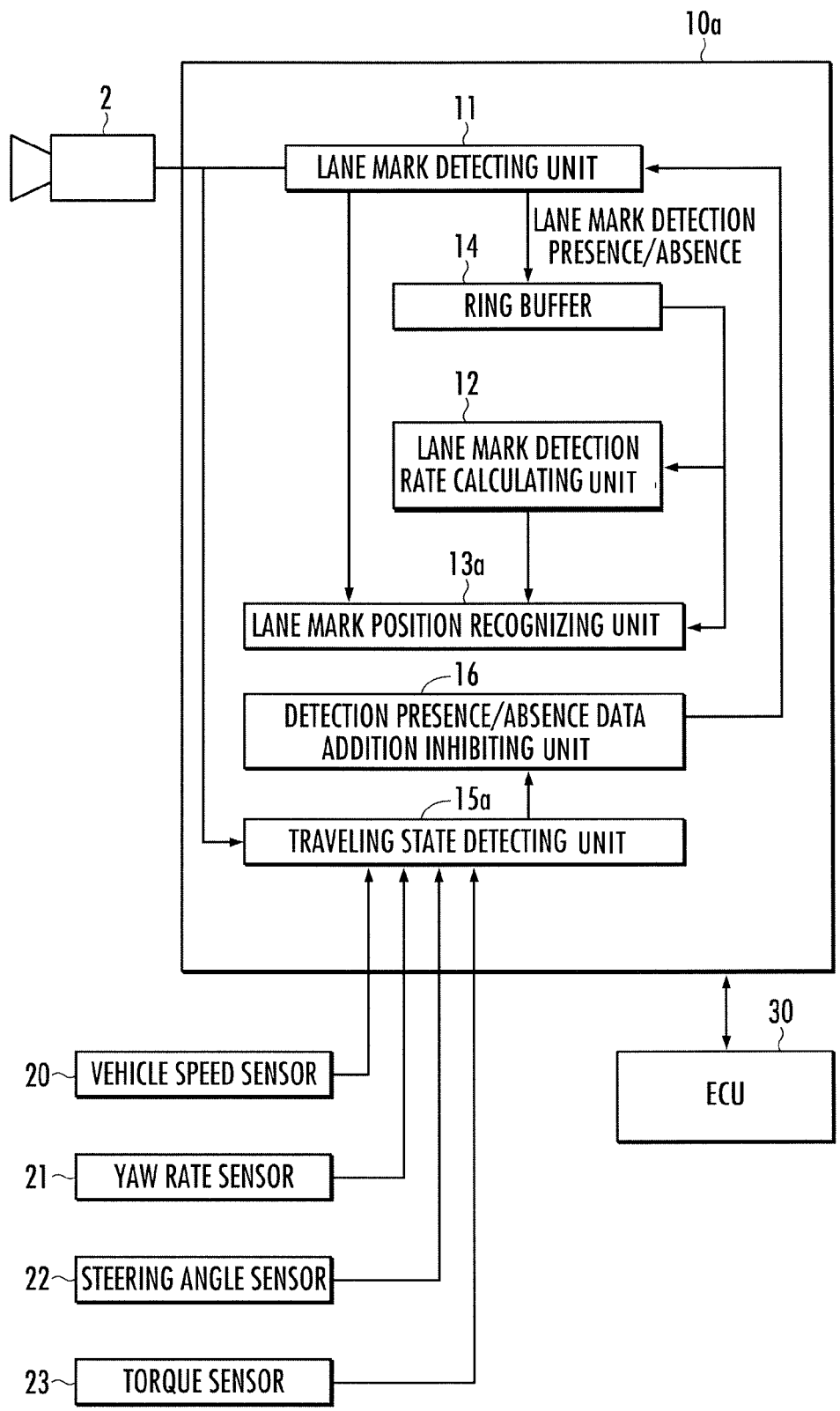
FIG. 2 is a configuration diagram of a first embodiment of the lane recognition device shown in FIG. 1.

The first embodiment will now be explained with reference to FIG. 2 through FIG. 8. With reference to FIG. 2, the lane recognition device 10a is equipped with a lane mark detecting unit 11 which detects the lane mark (white lines, yellow lines, cat's eyes, Botts Dots and the like) from the image of the road in front of the vehicle which is captured by the camera 2 in each control cycle, a ring buffer 14 which is sequentially written with and which stores a detection presence/absence data showing the presence/absence of the lane mark detection by the lane mark detecting unit 11 (corresponds to a data storing unit of the present invention), a lane mark detection rate calculating unit 12 which calculates a lane mark detection rate which is an average detection rate of the lane mark from the detection presence/absence data stored in the ring buffer 14, a lane mark position recognizing unit 13a which recognizes the relative position of the vehicle and the lane mark, when the lane mark detection rate is higher than a reliability threshold value, a traveling state detecting unit 15a which detects that the vehicle 1 is traveling in an intersection, and a detection presence/absence data addition inhibiting unit 16 which inhibits addition of the new detection presence/absence data to the ring buffer 14, when it is detected by the traveling state detecting unit 15a that the vehicle 1 is traveling in the intersection.

The lane recognition device 10a is an electronic unit configured from a microcomputer and the like, and the microcomputer functions as the lane mark detecting unit 11, the lane mark detection rate calculating unit 12, the lane mark position recognizing unit 13a, the traveling state detecting unit 15a, and the detection presence/absence data addition inhibiting unit 16, by making the microcomputer execute a program for lane recognition.

Further, the lane recognition device 10a is input with respective detection signals from the vehicle speed sensor 20, the yaw rate sensor 21, the steering angle sensor 22, and the torque sensor 23.

Figure 3:
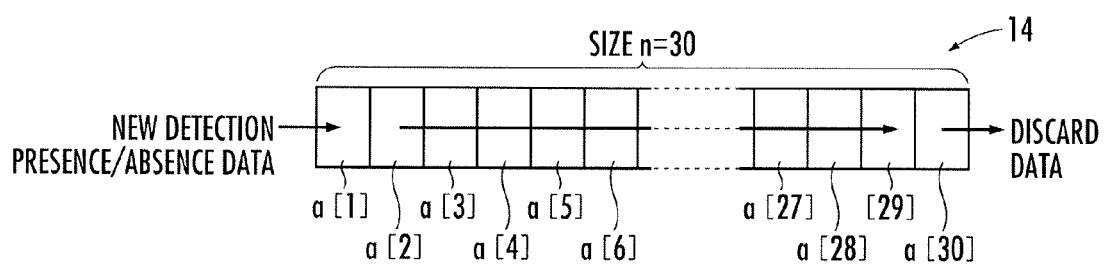
FIG. 3 is an explanatory view of a ring buffer.

The ring buffer 14 has a capacity for storing thirty pieces of the detection presence/absence data (array elements a[1], a[2], . . . , a[30]), as is shown in FIG. 3. Then, the newly added detection presence/absence data is stored in a[1], and the data stored in a[1] up to that point in time is shifted to a[2]. Similarly, data stored in a[2], a[3], . . . , a[29] up to that point in time is shifted to a[3], a[4], . . . , a[30], respectively. Then, data stored in a[30] up to that point in time is discarded.

Next, the operation of the lane recognition device 10a will be explained following the flow chart shown in FIG. 4. The lane recognition device 10a repeatedly executes the processing of STEP 1 through STEP 8 and STEP 20 in each predetermined control cycle.

First, the lane recognition device 10a takes in the image of the road in front of the vehicle with the camera 2 in STEP 1. The subsequent STEP 2 is a processing by the lane mark detecting unit 11. The lane mark detecting unit 11 carries out a line extracting process such as a Hough transformation to edge points extracted from the image of the road, and executes the processing of detecting an image portion of the lane mark.

Figure 5A:
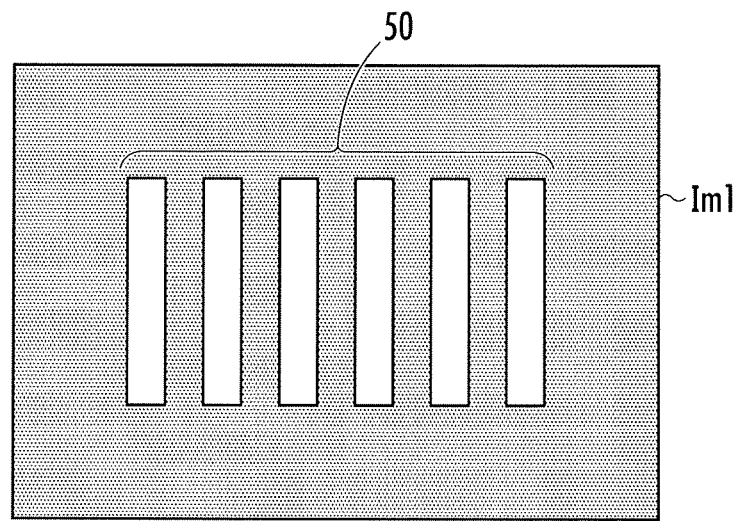
FIG. 5A is an explanatory view of a processing of detecting that the vehicle is passing through the intersection from the captured images of a camera showing an image portion of a pedestrian crossing existing the image of the road.

The subsequent STEP 3 is a processing by the traveling state detecting unit 15a. The traveling state detecting unit 15a detects that the vehicle 1 is in a state of traveling in the intersection, in the case where an image portion 50 of a pedestrian crossing exists in the image Im1 of the road, as is shown in FIG. 5A.

Figure 5B:
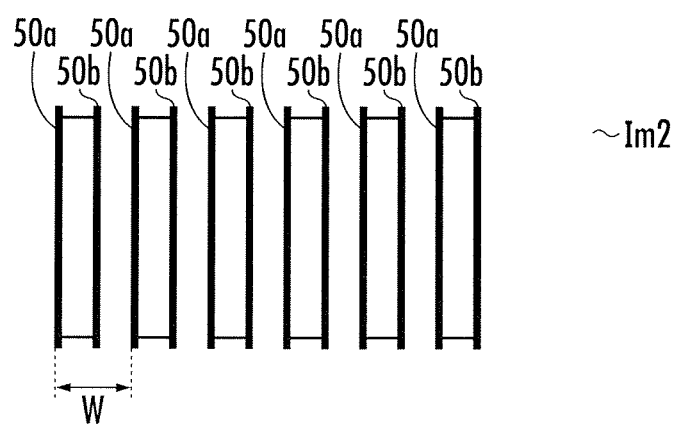
FIG. 5B is an explanatory view of a processing of detecting that the vehicle is passing through the intersection from the captured images of the camera, showing an image obtained by performing the edge extraction to the image of the road.

Here, the traveling state detecting unit 15a judges that the image portion of the pedestrian crossing is included in the image, when a rising edge 50a and a falling edge 50b are detected periodically by intervals w1, w2 in a mode complying with a Government Order on Road Design Standards in an image Im2 in FIG. 5B which is obtained by performing the edge extraction to the image Im1 of the road.

When it is detected in STEP 3 that the vehicle 1 is traveling in the intersection by the traveling state detecting unit 15a, the process branches to STEP 20, and the process proceeds to STEP 4 when it is not so detected. STEP 4 is a processing by the lane mark detecting unit 11, and the lane mark detecting unit 11 adds the detection presence/absence data which indicates whether or not the lane mark is detected by the lane mark detecting process in STEP 2 to the ring buffer 14.

Further, STEP 20 is a processing by the detection presence/absence data addition inhibiting unit 16. The detection presence/absence data addition inhibiting unit 16 inhibits addition of the detection presence/absence data to the ring buffer 14, during the time when the traveling state detecting unit 15a detects that the vehicle 1 is traveling in the intersection.

Figure 6A:
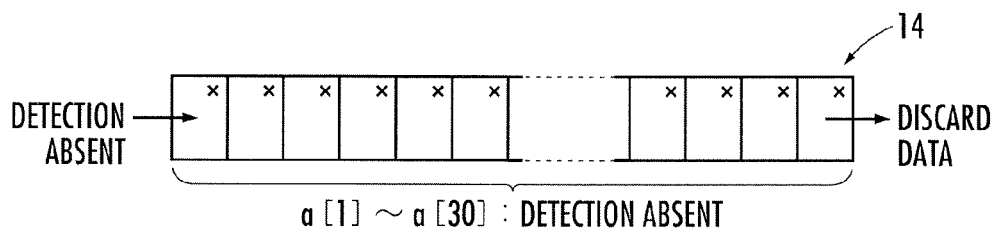
FIG. 6A is an explanatory view indicating the change of data in the ring buffer, when the vehicle has passed through the intersection, showing detection presence/absence data indicating absence of lane mark detection.

Because the lane mark is not laid inside the intersection, the lane mark is not detected by the lane mark detecting unit 11 when the vehicle 1 is traveling in the intersection. Therefore, if the detection presence/absence data is added to the ring buffer 14 even when the vehicle 1 is traveling in the intersection, data indicating absence of detection of lane mark is written to all of the array elements a[1] through a[30] of the ring buffer 14, as is indicated in FIG. 6A, when the vehicle 1 has passed through the intersection. Here, in FIG. 6A through FIG. 6C, the state where data indicating presence of detection of lane mark is written is expressed by o, and the state where data indicating absence of detection of lane mark is written is expressed by x.

Figure 6B:
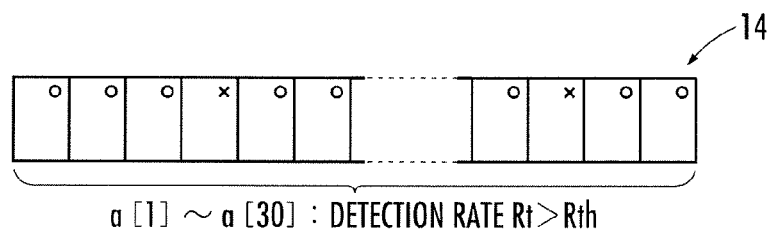
FIG. 6B is an explanatory view indicating the change of data in the ring buffer, when the vehicle has passed through the intersection, showing the detection presence/absence data in a state immediately before the vehicle enters the intersection.

On the other hand, when the detection presence/absence data addition inhibiting unit 16 inhibits addition of the detection presence/absence data to the ring buffer 14 when the vehicle 1 is traveling in the intersection, for example as is shown in FIG. 6B, the ring buffer 14 is maintained in a state at a point in time when the traveling state detecting unit 15a starts detecting that the vehicle 1 is traveling in the intersection (the point in time when the vehicle 1 enters the intersection).

FIG. 6B shows the ring buffer 14 stored with the detection presence/absence data in a state immediately before the vehicle enters the intersection and where the lane mark is detected steadily. In this case, a lane mark detection rate Rt which is an average detection rate of the array elements a[1] through a[30] is higher than the reliability threshold value Rth which is for determining that the reliability of the lane mark detection is high.

The subsequent STEP 5 through STEP 6 is a processing by the lane mark detection rate calculating unit 12. In STEP 5, the lane mark detection rate calculating unit 12 determines whether or not the lane mark is detected by the lane mark detecting unit 11. Then, when the lane mark is detected, the process proceeds to STEP 6, and the lane mark detection rate calculating unit 12 calculates the lane mark detection rate Rt by an Expression (1) below.

$$Rt = \frac{m}{n} \times 100\% \qquad (1)$$

Where Rt: an average lane mark detection rate of n array elements from the newly added array element, n: total number of array elements in the ring buffer (thirty (30) in the present embodiment), and m: the number of array elements in the ring buffer storing the detection presence/absence data indicating presence of lane mark detection.

On the other hand, when the lane mark is not detected, the process branches to STEP 9, and in this case the lane recognition device 10a terminates the processing of one control cycle, without executing the processing of STEP 6 through STEP 8.

The next STEP 7 through STEP 8 are a processing by the lane mark position recognizing unit 13a. In STEP 7, the lane mark position recognizing unit 13a judges whether or not the lane mark detection rate Rt is higher than the reliability threshold value Rth. Then, if the lane mark detection rate Rt is higher than the reliability threshold value Rth, the process proceeds to STEP 8, and the lane mark position recognizing unit 13a recognizes the relative position of the vehicle 1 and the lane mark in real space on the basis of the detection result of the image portion of the lane mark by the lane mark detecting unit 11, and transmits the data of the relative position to the ECU 30.

The ECU 30 receiving the data of the relative position of the vehicle 1 and the lane mark executes the above-mentioned lane maintaining control and the lane departure warning control. Then, the process proceeds to STEP 9, and the lane recognition device 10a terminates the processing of one control cycle.

On the other hand, if the lane mark detection rate Rt is equal to or less than the reliability threshold value Rth, the process branches from STEP 7 to STEP 9. In this case, the recognition of the relative position of the vehicle 1 and the lane mark is not executed by the lane mark position recognizing unit 13a. Thereafter, the lane recognition device 10a terminates the processing of one control cycle.

Here, as is shown in FIG. 6A, consideration is given to a case where the vehicle 1 passes through the intersection and returns to the state where the lane mark is being detected, in the state where the detection presence/absence data indicating absence of lane mark detection is stored in all of the array elements a[1] through a[30] of the ring buffer 14. In this case, for example if the reliability threshold value Rth is set to 50%, the earliest time the lane mark detection rate Rt becomes higher than the reliability threshold value Rth is after lapse of time corresponding to sixteen control cycles in which the detection presence/absence data indicating presence of lane mark detection is stored in all of the array elements a[1] through a[16].

Next, as is shown in FIG. 6B, consideration is given to a case where the vehicle 1 passes through the intersection and returns to the state where the lane mark is being detected, in the state where the detection presence/absence data at the time the vehicle 1 enters the intersection is stored in the array elements a[1] through a[30] of the ring buffer 14 and the lane mark detection rate Rt is higher than the reliability threshold value Rth.

Figure 6C:
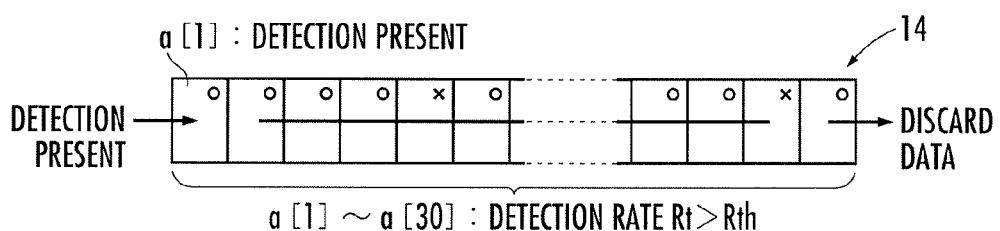
FIG. 6C is an explanatory view indicating the change of data in the ring buffer, when the vehicle has passed through the intersection, showing when the lane mark is detected and the new detection presence/absence data is added to the array element.

In this case, as is shown in FIG. 6C, when the lane mark is detected and the new detection presence/absence data is added to the array element a[1], the state where the lane mark detection rate Rt of the array elements a[1] through a[30] is higher than the reliability threshold value Rth continues.

Figure 4:
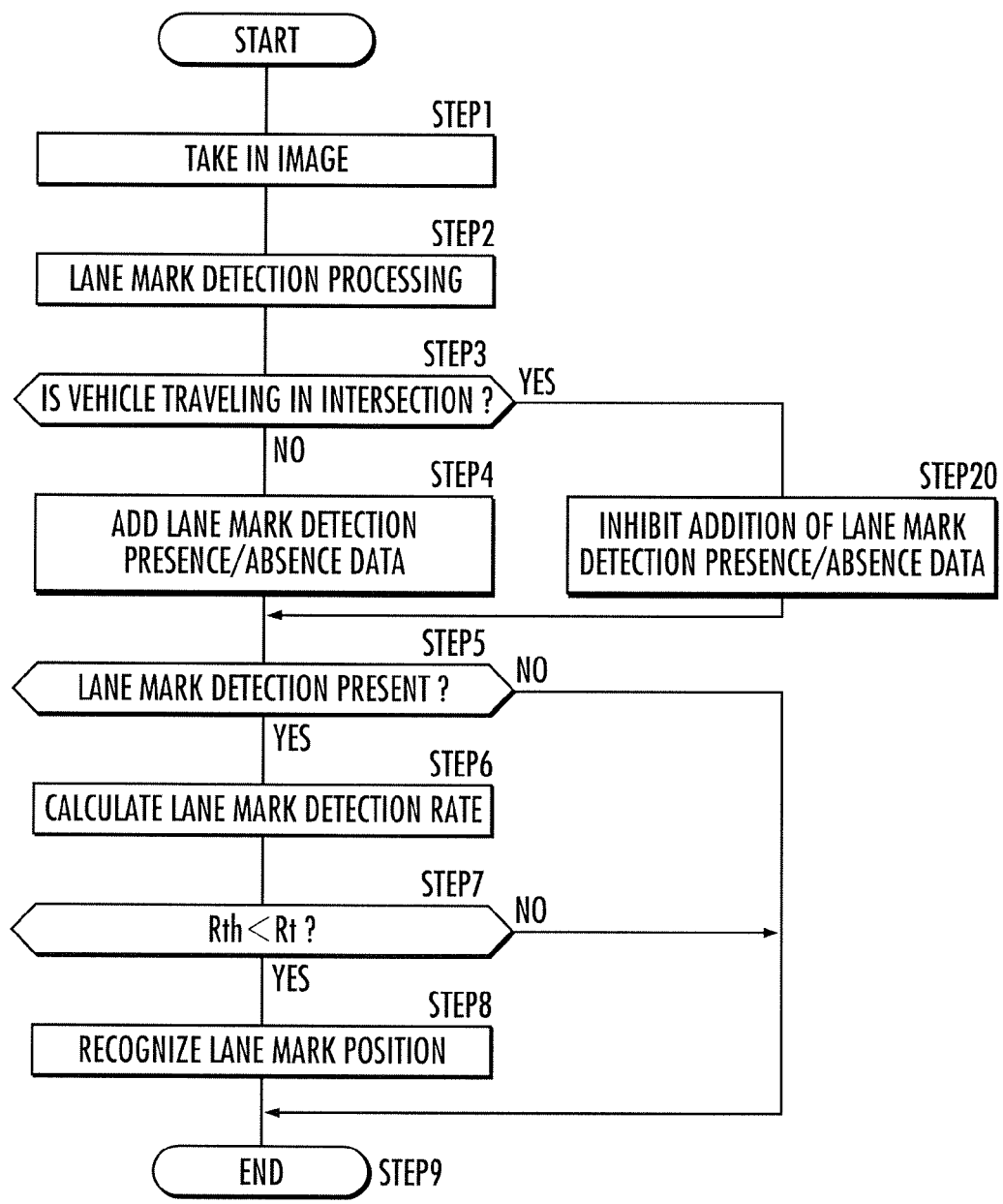
FIG. 4 is a flow chart of a reliability judgment on lane mark detection in the first embodiment, and a relative position recognition of the vehicle and the lane mark on the basis of the result of the reliability judgment.

Therefore, when the lane mark is detected by the lane mark detection process in STEP 2 of the flow chart shown in FIG. 4, and the lane mark detection rate Rt is calculated when the process proceeds from STEP 5 to STEP 6, the lane mark detection rate Rt becomes higher than the reliability threshold value Rth in STEP 7. Then, in subsequent STEP 8, the lane mark position recognizing unit 13a calculates the relative position of the vehicle 1 and the lane mark.

Therefore, the lapse time until the lane mark detection rate Rt becomes higher than the reliability threshold value Rth (for example, if Rth is 50%, at least the time for sixteen control cycles) such as in the case where the detection presence/absence data indicating absence of lane mark detection is stored in each of the array elements a[1] through a[30] of the ring buffer 14, as is shown in FIG. 6A, does not arise.

Therefore, when the vehicle 1 passes through the intersection and the detection of the lane mark is made possible, the recognition process of the relative position of the vehicle 1 and the lane mark by the lane mark position recognizing unit 13a is promptly executed, and the above mentioned lane maintaining control and the lane departure warning control by the ECU 30 is resumed.

Here, in the present embodiment, the traveling state detecting unit 15a detected that the vehicle 1 is traveling in the intersection when the image portion of the pedestrian crossing is included in the image of the road, as is shown in FIG. 5A and FIG. 5B. However, the fact that the vehicle 1 is traveling in the intersection may be detected by other methods.

For example, if a GPS (Global Positioning System) is mounted on the vehicle 1, the fact that the vehicle 1 is traveling in the intersection may be detected by referring the position of the vehicle 1 obtained by GPS with a map data.

Alternatively, the fact that the vehicle 1 is passing through the intersection may be detected by judging a straightness of the movement of the vehicle 1 from the detected signals from the vehicle speed sensor 20 and the yaw rate sensor 21. Further, the fact that the vehicle 1 is passing through the intersection may be detected by judging the operating state of the steering by the driver from the detected signals from the steering angle sensor 22 and the torque sensor 23.

Figure 7A:
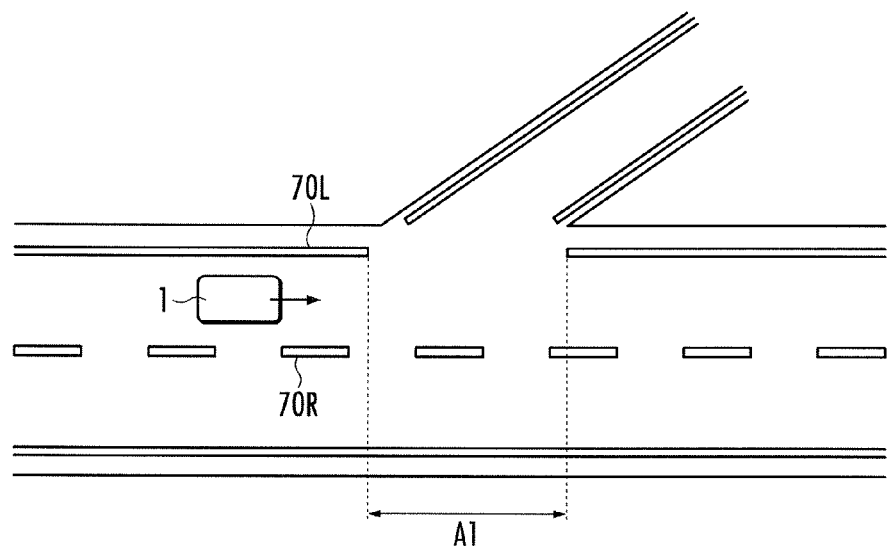
FIG. 7A is an explanatory view of the state where the vehicle is passing through a branching section of a road.
Figure 7B:
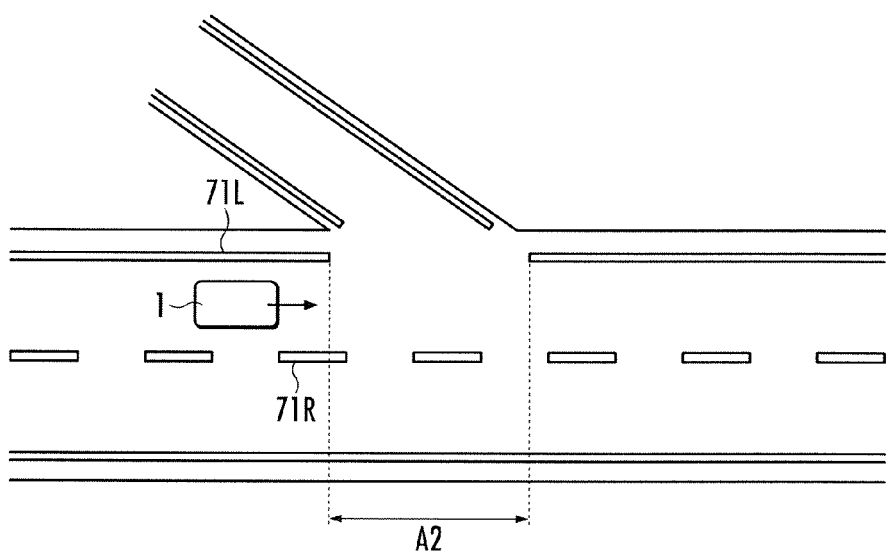
FIG. 7B is an explanatory view of the state where the vehicle is passing through a converging section of a road.

Moreover, in the present embodiment, the traveling state detecting unit 15a detected that the vehicle 1 is traveling in the intersection. However, it may be detected that the vehicle 1 is traveling in a branching section A1 of the road, as is shown in FIG. 7A, or the vehicle 1 is traveling in a converging section A2 of the road, as is shown in FIG. 7B.

In this case, when it is detected by the traveling state detecting unit 15a that the vehicle 1 is passing through the branching or the converging section of the road, the detection presence/absence data addition inhibiting unit 16 inhibits addition of the new detection presence/absence data to the ring buffer 14. Thereafter, when the vehicle 1 passes through the branching/converging section and becomes possible to detect the right and left lane marks, it becomes possible to promptly recognize the relative position of the vehicle 1 and the lane mark, and resume the lane maintaining control and the lane departure warning control by the ECU 30.

Here, the detecting of the fact that the vehicle 1 is traveling in the branching or the converging section of the road may be carried out by, for example, detecting that the state where right and left lane marks are detected switches to the state where only either one of the lane mark is detected, or judging the state of the road on which the vehicle 1 is traveling from the GPS and the map data.

Second Embodiment

A second embodiment of the invention will now be explained with reference to FIGS. 7A-7B, and 9 through 12. The configuration of the second embodiment is identical to the first embodiment, except that a part of the configuration of the lane recognition device 10b is different from that of the lane recognition device 10a of the first embodiment. The configuration which is the same as in the first embodiment is provided with the same reference number and the explanation thereof will be omitted.

Figure 9:
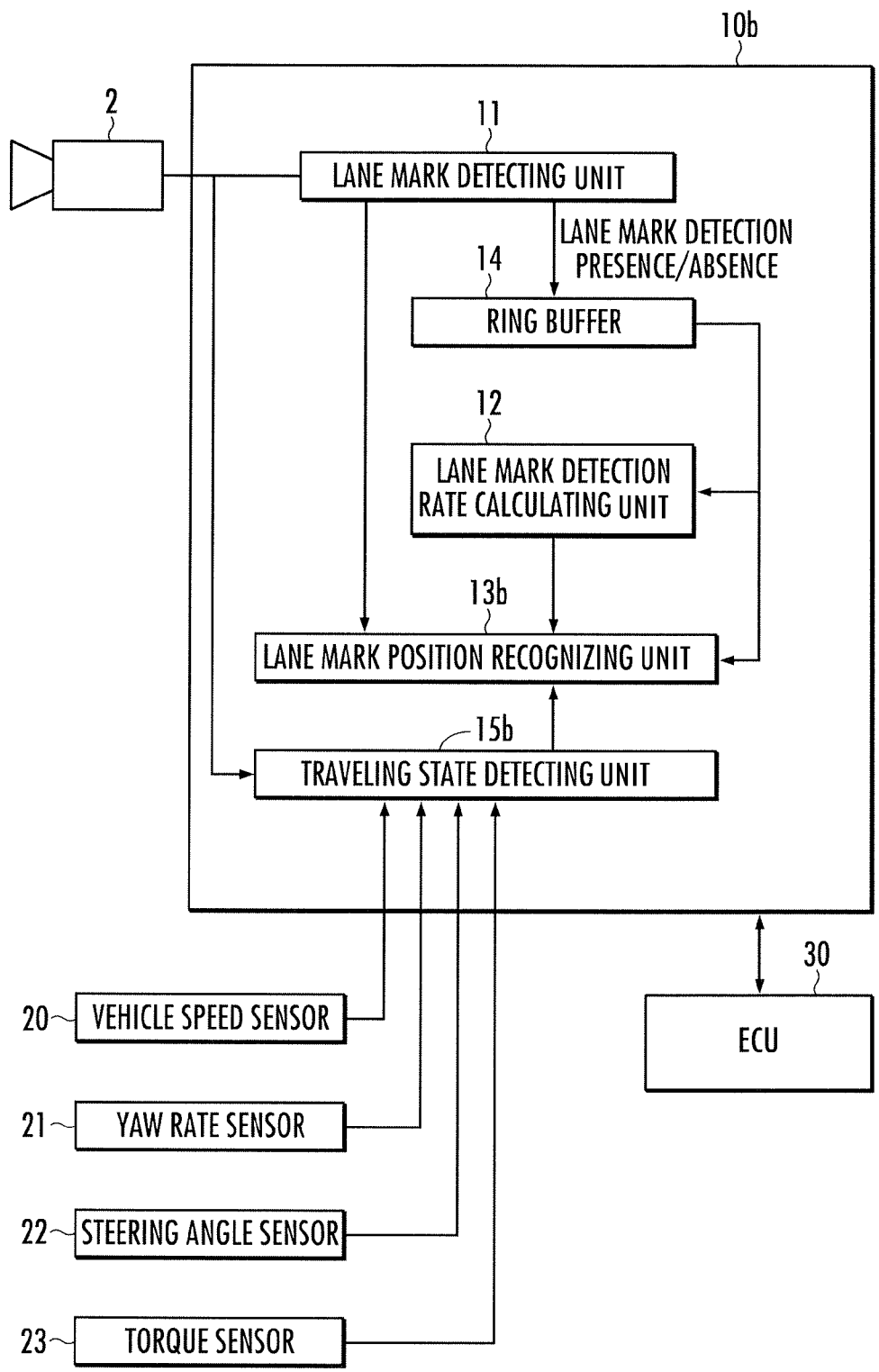
FIG. 9 is a configuration diagram of a second embodiment of the lane recognition device shown in FIG. 1.

With reference to FIG. 9, the lane recognition device 10b is equipped with a lane mark position recognizing unit 13b which recognizes the relative position of the vehicle and the lane mark, and a traveling state detecting unit 15b which detects that the vehicle 1 has passed through the intersection.

The lane recognition device 10b is an electronic unit configured from a microcomputer and the like, and the microcomputer functions as the lane mark detecting unit 11, the lane mark detection rate calculating unit 12, the lane mark position recognizing unit 13b, and the traveling state detecting unit 15b, by making the microcomputer execute a program for lane recognition. Further, the lane recognition device 10b is input with respective detection signals from the vehicle speed sensor 20, the yaw rate sensor 21, the steering angle sensor 22, and the torque sensor 23.

Figure 10:
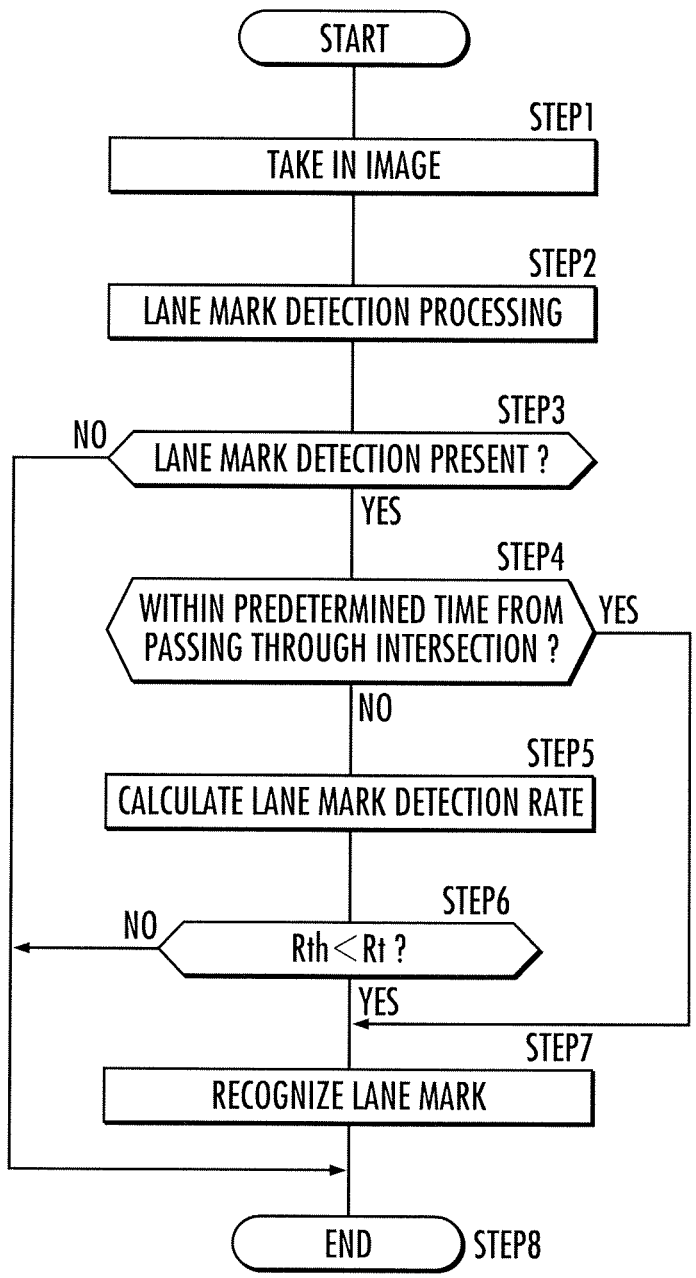
FIG. 10 is a flow chart of a reliability judgment on passing of the intersection and the lane mark detection in the second embodiment, and the relative position recognition of the vehicle and the lane mark.

Next, operation of the lane recognition device 10b will be explained following the flow chart shown in FIG. 10. The lane recognition device 10b repeatedly executes the processing of STEP 1 through STEP 7 of FIG. 10 in each predetermined control cycle.

First, the lane recognition device 10b takes in the image of the road in front of the vehicle with the camera 2 in STEP 1. The subsequent STEP 2 is a processing by the lane mark detecting unit 11. The lane mark detecting unit 11 carries out a line extracting process such as a Hough transformation to edge points extracted from the image of the road, and executes the processing of detecting an image portion of the lane mark. Further, the lane mark detecting unit 11 adds the detection presence/absence data which indicates whether or not the lane mark is detected to the ring buffer 14.

In subsequent STEP 3, the lane recognition device 10b judges whether or not the image portion of the lane mark is detected. Thereafter, in the case where the image portion of the lane mark is detected, the process proceeds to STEP 3, and in the case where the image portion of the lane mark is not detected, the process proceeds to STEP 8 and terminates the processing.

In subsequent STEP 4, it is judged whether or not a current time is within a predetermined time from the time the vehicle 1 has passed through the intersection. Here, the detection of the fact that the vehicle 1 has passed through the intersection is executed by the traveling state detecting unit 15b, and the judgment on whether or not the current time is within the predetermined time from the time the vehicle 1 has passed through the intersection is executed by the lane mark position recognizing unit 13b. The lapse of the predetermined time in STEP 4 corresponds to the predetermined condition of the present invention.

The detecting process of the fact that the vehicle 1 has passed through the intersection by the traveling state detecting unit 15b will be explained later. Further, the predetermined time in STEP 4 is set with the assumption of the time in which the lane mark detection rate Rt calculated by the lane mark detection rate calculating unit 12 becomes higher than the reliability threshold value Rth.

In STEP 4, if the predetermined time had lapsed from the time the vehicle 1 has passed through the intersection, the process proceeds to STEP 5. STEP 5 is a processing by the lane mark detection rate calculating unit 12, and the lane mark detection rate calculating unit 12 calculates the lane mark detection rate Rt with the Equation (1) mentioned above.

The subsequent STEP 6 through STEP 7 are the processing by the lane mark position recognizing unit 13b. In STEP 6, the lane mark position recognizing unit 13b judges whether or not the lane mark detection rate Rt is higher than a reliability threshold value Rth.

If the lane mark detection rate Rt is higher than the reliability threshold value Rth, the process proceeds to STEP 7, and the lane mark position recognizing unit 13b recognizes the relative position of the vehicle 1 and the lane mark in real space on the basis of the detection result of the lane mark by the lane mark detecting unit 11. Thereafter, the lane mark position recognizing unit 13b transmits the data of the relative position to the ECU 30, the process proceeds to STEP 8, and the lane recognition device 10b terminates the processing of one control cycle.

On the other hand, if the lane mark detection rate Rt is equal to or less than the reliability threshold value Rth in STEP 6, the process branches to STEP 8. In this case, the lane mark position recognizing unit 13b does not execute the recognition of the relative position of the vehicle 1 and the lane mark, and the lane recognition device 10b terminates the processing of one control cycle.

Further, if the current time is within the predetermined time from the time the vehicle 1 has passed through the intersection in STEP 4, the process proceeds to STEP 7. In this case, the judgment on whether or not the lane mark detection rate Rt is higher than the reliability threshold value Rth in STEP 5 through STEP 6 is not carried out, and the lane mark position recognizing unit 13b calculates the relative position of the vehicle 1 and the lane mark in STEP 7.

Figure 11:
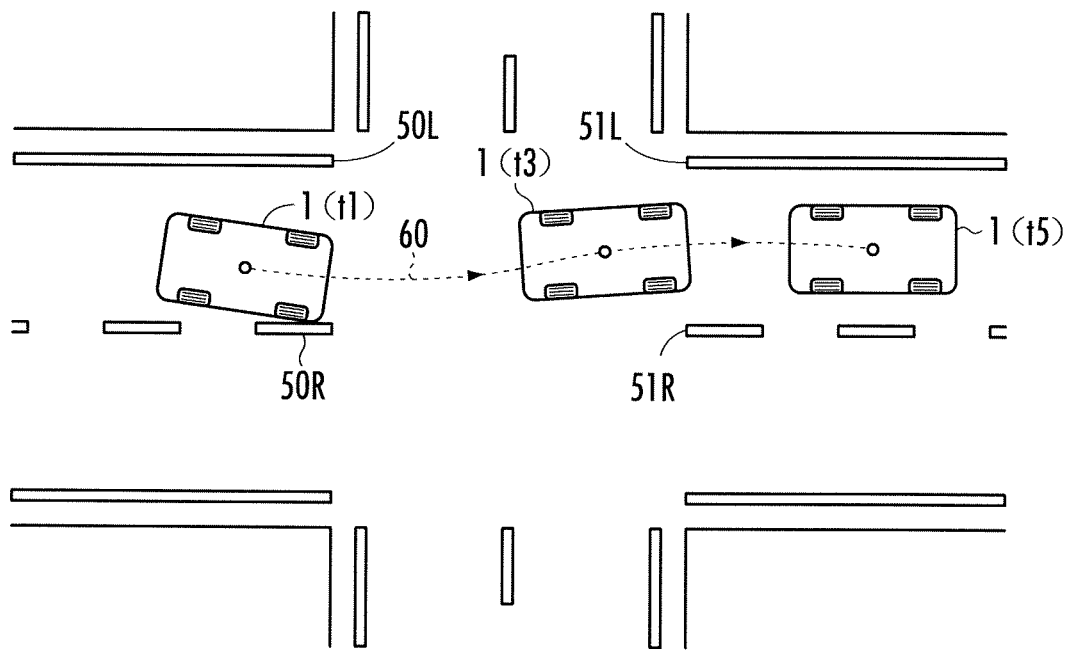
FIG. 11 is an explanatory view of a trajectory of the vehicle when passing through the intersection.

FIG. 11 shows a trajectory of the vehicle 1 when passing through the intersection, and t1 indicates the point in time when the state the left and right lane marks 50L, 50R of the vehicle 1 are detected (a lane mark detected state) is switched to the state where the lane marks 50L, 50R are not detected (a lane mark undetected stated).

Further, t3 indicates the point in time when the lane mark undetected state is switched to the lane mark detected state. Moreover, t5 indicates the point in time when the state in which the recognition process of the relative position of the vehicle 1 and the lane mark by the lane mark position recognizing unit 13b is not executed (a lane mark position unrecognized state) is switched to the state in which the recognition process of the relative position of the vehicle 1 and the lane mark is executed (a lane mark position recognized state), in the case where the recognition of the relative position of the vehicle 1 and the lane mark is executed only when the lane mark detection rate Rt is higher than the reliability threshold value Rth, such as in the conventional lane recognition device.

Figure 12:
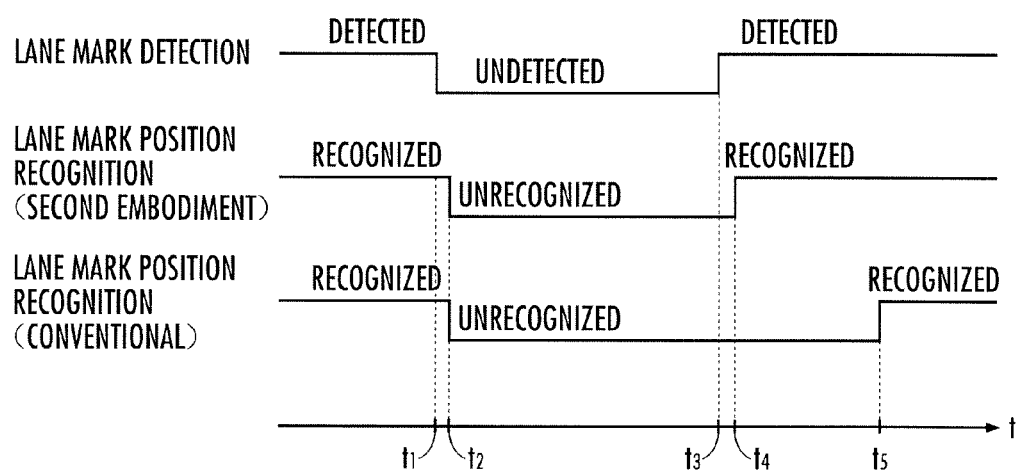
FIG. 12 is an explanatory view of the reliability judgment of the lane mark detection in the second embodiment.

FIG. 12 is a timing chart in the state as is shown in FIG. 11, and indicates from the top the switching of the lane mark detected state and the lane mark undetected state, switching of the lane mark position recognized state and the lane mark position unrecognized state in the lane recognition device 10b of the second embodiment, and switching of the lane mark position recognized state and the lane mark position unrecognized state in the conventional lane recognition device.

In the conventional lane recognition device, it is necessary to wait for the lane mark detection rate Rt to become higher than the reliability threshold value Rth, when the vehicle 1 passes through the intersection and the lane mark undetected state is switched to the lane mark detected state. Therefore, the time from t3, in which the vehicle 1 passes through the intersection and the lane mark position undetected state switches to the lane mark position detected state, to t5 in which the lane mark position unrecognized state is switched to the lane mark position recognized state, becomes longer. Further, the lane maintaining control and the lane departure warning control by the ECU 30 mentioned above is not executed until t5.

In contrast thereto, in the lane recognition device 10b of the second embodiment, if the current time is within the predetermined time from the time it is detected that the vehicle 1 has passed through the intersection, the lane mark position recognizing unit 13b recognizes the relative position of the vehicle 1 and the lane mark even if the lane mark detection rate Rt is equal to or less than the reliability threshold value Rth. Therefore, it becomes possible to promptly resume calculation of the relative position of the vehicle 1 and the lane mark, at t4 in which a lag time for calculation is added to the time t3 when the vehicle 1 has passed through the intersection.

FIRST EXAMPLE

Next, explanation is given on a first example of the detecting process by the traveling state detecting unit 15b on the fact that the vehicle 1 has passed through the intersection. With reference to FIG. 11, the traveling state detecting unit 15b calculates a trajectory 60 of the vehicle 1 from t1, in which the lane mark detected state is switched to the lane mark undetected state (corresponds to the first point in time of the present invention), to t3, in which it is subsequently switched to the lane mark detected state (corresponds to the second point in time of the present invention).

More specifically, the traveling state detecting unit 15b calculates the trajectory 60 of the vehicle 1 from the traveling speed of the vehicle 1 detected by the vehicle speed sensor 20, and the yaw rate of the vehicle 1 detected by the yaw rate sensor 21. Thereafter, the traveling state detecting unit 15b detects that the vehicle 1 has passed through the intersection, when the conditions (1) and (2) explained below are satisfied.

(1) an amount of change of the trajectory 60 with respect to the road width direction at t1 is equal to or less than a predetermined width direction amount of change threshold value (for example, it is set to around 17% of the width between the lane marks 50R, 50L (if width is 3.6 m then 0.6 m)).

(2) a difference between the width between the lane marks 50R, 50L in t1 and the width between the lane marks 51R, 51L in t3 is equal to or less than a predetermined road width change threshold value (for example, it is set to around 10% of the width between the lane marks 51R, 51L (if width is 3.6 m then ±0.36 m).

Here, the fact that the vehicle 1 has passed through the intersection may be detected only using the condition (1) above. Further, the detection accuracy of the passing through of the intersection may be improved by adding a condition (3) below as the conditions for detecting the fact that the vehicle 1 has passed through the intersection.

(3) a lapsed time from t1 to t3 is equal to or less than an anticipated passing time, which is calculated by dividing the preliminarily anticipated passing distance of the intersection by the traveling speed of the vehicle 1.

Further, as the detecting process by the traveling state detecting unit 15b on the fact that the vehicle 1 has passed through the intersection, second through sixth examples mentioned below may be adopted.

SECOND EXAMPLE

The traveling state detecting unit 15b detects that the vehicle 1 has passed through the intersection, when the condition (4) below and the condition (2) explained above are satisfied.

(4) an amount of change of a direction of the trajectory 60 of the vehicle 1 from t1 through t3 is equal to or less than a predetermined direction of movement threshold value (for example, 1.2° (if the width of the intersection is 25 m, then the moving amount in the lateral direction of the vehicle 1 traveling the intersection becomes 0.5 m)).

Here, the fact that the vehicle 1 has passed through the intersection may be detected only using the condition (4) above. Further, the detection accuracy of the passing through of the intersection may be improved by adding the condition (3) mentioned above as the conditions for detecting the fact that the vehicle 1 has passed through the intersection.

THIRD EXAMPLE

The traveling state detecting unit 15b detects that the vehicle 1 has passed through the intersection, when a condition (5) or (6) below is satisfied.

(5) a maximum value of the torque (absolute value) applied to the steering 5 and detected by the torque sensor 23 from t1 through t3 is equal to or less than a predetermined torque threshold value.

(6) an amount of change of the torque applied to the steering 5 and detected by the torque sensor 23 from t1 to t3 is equal to or less than a predetermined torque amount of change threshold value. Here, as the amount of change of the torque, a value of integral of a square value of the torque detected by the torque sensor 23 may be used.

FOURTH EXAMPLE

The traveling state detecting unit 15b detects that the vehicle 1 has passed through the intersection, when a condition (7) or (8) below is satisfied.

(7) a maximum value of the steering angle (absolute value) of the steering 5 detected by the steering angle sensor 22 from t1 to t3 is equal to or less than a predetermined steering angle threshold value.

(8) an amount of change of the steering angle of the steering 5 detected by the steering angle sensor 22 from t1 to t3 is equal to or less than a predetermined steering angle amount of change threshold value.

FIFTH EXAMPLE

The traveling state detecting unit 15b detects that the vehicle 1 has passed through the intersection, when a condition (9) or (10) below is satisfied.

(9) a rotational speed difference of the right and left front wheels of the vehicle 1 from t1 to t3 is equal to or less than a predetermined rotational speed difference threshold value. Here, the rotational speed difference of the right and left front wheels is obtained by an internal arithmetic processing of the lane recognition device 10b or the ECU 30, on the basis of the detected signal of the rotational speed of the right front wheel and the detected signal of the rotational speed of the left front wheel by the vehicle speed sensor 20. The configuration of obtaining the rotational speed difference of the right and left front wheels as mentioned above corresponds to the rotational speed difference detecting unit of the present invention.

(10) an amount of change of the rotational speed difference of the right and left front wheels of the vehicle 1 from t1 to t3 is equal to or less than a predetermined rotational speed difference threshold value.

SIXTH EXAMPLE

The traveling state detecting unit 15b detects that the vehicle 1 has passed through the intersection, when a condition (11) below is satisfied.

(11) a difference between the relative position of the vehicle 1 and the lane mark recognized by the lane mark position recognizing unit 13b on the basis of the detection result of the lane mark immediately before t1, and the relative position of the vehicle 1 and the lane mark recognized by the lane mark position recognizing unit 13b on the basis of the detection result of the lane mark at t3, is equal to or less than a predetermined relative position difference threshold value.

In the above-mentioned first example through the sixth example, the fact that the vehicle 1 has passed through the intersection may be detected only when the traveling speed of the vehicle 1 is equal to or less than a traveling speed threshold value assuming a traveling speed of general road in which the intersection exists.

Further, in the above-mentioned first example through the sixth example, the fact that the vehicle 1 has passed through the intersection may be detected only when the traveling speed of the vehicle 1 is equal to or more than a minimum speed for executing the lane maintaining control and the lane departure warning control mentioned above.

Moreover, in the second embodiment, the fact that the vehicle 1 has passed through the intersection is detected, however, there exists the section A1 in which one of the right and left lane marks 70R, 70L is not detected, when the vehicle 1 is passing through the branching section of the road, as is shown in FIG. 7A.

Similarly, as is shown in FIG. 7B, there exists the section A2 in which one of the right and left lane marks 71R, 71L is not detected, when the vehicle 1 is passing through the converging section of the road. Therefore, the lane maintaining control and the lane departure warning control mentioned above cannot be executed when traveling through the branching or the converging section of the road.

Therefore, similarly to the detection of the fact that the vehicle 1 has passed through the intersection mentioned above, the fact that the vehicle 1 has passed through the branching or the converging section of the road may be detected. Thereafter, when the fact that the vehicle 1 has passed through the branching or the converging section of the road is detected, it becomes possible to shorten the time in which the lane maintaining control and the lane departure warning control is stopped, by recognizing the relative position of the vehicle 1 and the lane mark even when the lane mark detection rate is equal to or less than the reliability threshold value if the current time is within a predetermined time from the point in time the vehicle 1 has passed through the branching or the converging section of the road.

In the second embodiment, as the condition for recognizing the relative position of the vehicle 1 and the lane mark even when the lane mark detection rate Rt is equal to or less than the reliability threshold value Rth (corresponding to the predetermined condition of the present invention), the time within the predetermined time from the point in time the vehicle 1 has passed through the intersection is set. However, as the predetermined condition of the present invention, for example, until the vehicle 1 travels a predetermined distance (set assuming the distance the lane mark detection rate Rt becomes higher than the reliability threshold value Rth) from the point in time when the vehicle 1 has passed through the intersection, or until the lane mark detection rate Rt becomes higher than the reliability threshold value Rth from the point in time the vehicle 1 has passed through the intersection, may be set.

Further, in the second embodiment, the fact that the vehicle 1 has passed through the intersection is detected on the basis of the presence/absence of lane mark detection and the detected values of various sensors such as the vehicle speed sensor 20. However, if the vehicle 1 is equipped with a GPS (Global Positioning System), the fact that the vehicle 1 has passed through the intersection may be detected with the GPS and the map data.

Further, in the first and the second embodiments, a configuration in which the camera 2 and the lane recognition device 10 and the ECU 30 are separated from one another is taken, as is shown in FIG. 1. However, the configuration of the camera and the lane recognition device and the ECU is not limited thereto. For example, the camera and the lane recognition device and the ECU may be configured integrally, and may be fixed to the position where the camera 2 is installed in FIG. 1.

What is claimed is:

1. A lane recognition device, comprising:
a lane mark detecting unit which executes a processing of detecting a lane mark partitioning a traffic lane of a road from an image of the road in the surrounding of a vehicle captured by a camera mounted on the vehicle in each predetermined control cycle;
a data storing unit which sequentially adds and stores a detection presence/absence data indicating presence/absence of detection of the lane mark in each control cycle;
a lane mark detection rate calculating unit which calculates a lane mark detection rate which is an average detection rate of the lane mark from the latest detection presence/absence data to the detection presence/absence data prior to the same by a predetermined number that are stored in the data storing unit;
a lane mark position recognizing unit which recognizes a relative position of the vehicle and the lane mark on the basis of the detection result of the lane mark by the lane mark detecting unit, when the lane mark detection rate is higher than a predetermined reliability threshold value, and stops recognition of the relative position, when the lane mark detection rate is equal to or less than the reliability threshold value;
a traveling state detecting unit which detects the fact that the vehicle is traveling in a intersection or a branching or a converging section of the road; and
a detection presence/absence data addition inhibiting unit which inhibits addition of the new detection presence/absence data to the data storing unit, when the traveling state detecting unit detects that the vehicle is traveling in the intersection or the branching or the converging section of the road.

2. The lane recognition device according to claim 1, wherein the traveling state detecting unit detects that the vehicle is traveling in the intersection, when an image of a pedestrian crossing is included in the captured image by the camera.

\* \* \* \* \*